(12) United States Patent
Ishigaki et al.

(10) Patent No.: US 9,960,694 B2
(45) Date of Patent: May 1, 2018

(54) SYSTEM AND METHOD FOR RECOVERING VOLTAGE IN A POWER CONVERSION CIRCUIT

(71) Applicant: TOYOTA MOTOR ENGINEERING & MANUFACTURING NORTH AMERICA, INC., Erlanger, KY (US)

(72) Inventors: Masanori Ishigaki, Ann Arbor, MI (US); Jongwon Shin, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 24 days.

(21) Appl. No.: 15/146,476

(22) Filed: May 4, 2016

(65) Prior Publication Data
US 2017/0324342 A1    Nov. 9, 2017

(51) Int. Cl.
*H02M 3/335* (2006.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 2001/0009* (2013.01)

(58) Field of Classification Search
CPC ......... H02M 2001/0032; H02M 3/156; H02M 2001/0025; H02M 3/33507; H02M 3/33523; H02M 3/33584; H02M 2001/007; H02M 3/1588; H02M 1/14; H02M 1/15; H02M 2001/0048; H02M 3/3378; H02M 2003/1566
See application file for complete search history.

(56) References Cited

U.S. PATENT DOCUMENTS

| | | | |
|---|---|---|---|
| 6,304,462 B1 * | 10/2001 | Balakrishnan .... | H02M 3/33507 363/21.01 |
| 6,370,042 B2 | 4/2002 | Gattavari et al. | |
| 9,143,043 B2 | 9/2015 | Zhang et al. | |
| 9,166,497 B2 | 10/2015 | Fujii | |
| 2013/0119956 A1 | 5/2013 | Cho et al. | |
| 2013/0322128 A1 * | 12/2013 | Takegami ......... | H02M 3/33507 363/17 |
| 2014/0145698 A1 | 5/2014 | Saito et al. | |
| 2015/0318779 A1 | 11/2015 | Cha et al. | |

* cited by examiner

*Primary Examiner* — Henry Lee, III
(74) *Attorney, Agent, or Firm* — Oblon, McClelland, Maier & Neustadt, L.L.P.

(57) ABSTRACT

A power system includes power conversion circuitry that has a first switch and a second switch on either side of a transformer. The system also includes gate driver circuitry that operates the first switch and the second switch. Power transfer in a normal operating mode from a primary side to secondary side of the DC-DC power conversion circuitry is controlled by operating the first switch. The system can recover voltage from the secondary side to the primary side by reversing a direction of power transfer when a voltage on the primary side of the DC-DC power conversion circuitry is less than an operating voltage of the gate driver circuitry. The system can resume the normal operating mode when the voltage on the primary is greater than the operating voltage of the gate driver circuitry.

19 Claims, 10 Drawing Sheets

SYSTEM AND METHOD FOR RECOVERING VOLTAGE IN A POWER CONVERSION CIRCUIT

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014. The present application also incorporates the entire contents of U.S. patent application Ser. No. 14/670,138 having common inventorship with the present application and filed in the U.S. Patent and Trademark Office on Mar. 26, 2015.

BACKGROUND

A power conversion circuit reaches an under voltage lockout (UVLO) condition when a voltage supplying power to a gate driver controlling the switches of the power conversion circuit falls below a gate driver operating voltage. U.S. Pat. No. 6,370,042 to Gattavari et al. describes a power conversion circuit that includes both self-disabling and self-recovery functionality based on predetermined sensor values indicating an abnormal condition.

SUMMARY

In an exemplary implementation, a power system includes power conversion circuitry that has a first switch and a second switch on either side of a transformer. The system also includes gate driver circuitry that operates the first switch and the second switch. Power transfer in a normal operating mode from a primary side to secondary side of the DC-DC power conversion circuitry is controlled by operating the first switch. The system can recover voltage from the secondary side to the primary side by reversing a direction of power transfer when a voltage on the primary side of the DC-DC power conversion circuitry is less than an operating voltage of the gate driver circuitry. The system can resume the normal operating mode when the voltage on the primary is greater than the operating voltage of the gate driver circuitry.

The DC-DC power conversion circuitry can include a first capacitor and a second capacitor cross-connected across the transformer.

The primary side and the secondary side of the DC-DC power conversion circuitry can be symmetric across the transformer.

The gate driver circuitry can include primary gate driver circuitry powered by the primary side of the DC-DC power conversion circuitry and secondary gate driver circuitry powered by the secondary side of the DC-DC power conversion circuitry. The DC-DC power conversion circuitry can include primary and secondary gate power converters to convert the voltage on the primary side and a voltage on the secondary side to the operating voltage of the primary gate driver circuitry and the secondary gate driver circuitry.

The DC-DC power conversion circuitry can be configured to perform bi-directional power transfer.

The system can reverse the direction of power transfer independent of a phase of the first switch and the second switch.

The second switch of the DC-DC power conversion circuitry can operate as a synchronous rectifier when power is transferred from the primary side to the secondary side of the DC-DC power conversion circuitry. The voltage on the primary side of the DC-DC power conversion circuitry can be recovered from the secondary side of the DC-DC power conversion circuitry via the synchronous rectifier when the voltage on the primary side is less than the operating voltage of the gate driver circuitry.

The system can control an amount of power transferred between the primary side and the secondary side of the DC-DC power conversion circuitry is based on an on-time of the first switch or the second switch.

The system can control an amount of power transferred between the primary side and secondary side of the DC-DC power conversion circuitry independent of the voltage on the primary side or a voltage on the secondary side.

The system can resume the normal operating mode of the DC-DC power conversion circuitry when the voltage on the primary side is greater than a threshold equal to the operating voltage of the gate driver circuitry plus a predetermined buffer amount. The predetermined buffer amount can be determined based on a voltage rate of change in the normal operating mode.

A rate of change of the voltage on the primary side of the DC-DC power conversion circuitry can be lower in a recovery mode where the direction of power transfer is reversed than in the normal operating mode when energy module failure occurs.

The system can disable an energy module associated with the DC-DC power conversion circuitry when the voltage on the primary side of the DC-DC power conversion circuitry is less than a system under voltage threshold. The system under voltage threshold is less than the operating voltage of the gate driver circuitry.

The system can operate in a recovery mode during standby operations of the DC-DC power conversion circuitry to balance a state of charge of one or more energy modules.

In a further exemplary implementation, a process can include: controlling power transfer from a primary side to a secondary side of DC-DC power conversion circuitry including a first switch and a second switch on either side of a transformer via the first switch in a normal operating mode; recovering voltage from the secondary side to the primary side by reversing a direction of the power transfer when a voltage on the primary side of the DC-DC power conversion circuitry is less than an operating voltage of gate driver circuitry configured to operate the first switch and the second switch; and resuming the normal operating mode when the voltage on the primary side is greater than the operating voltage of the gate driver circuitry. A non-transitory computer-readable storage medium including executable instructions, which when executed by circuitry, can cause the circuitry to perform the process.

In a further exemplary implementation, a system controller includes control circuitry that can control power transfer from a primary side to a secondary side of DC-DC power conversion circuitry including a first switch and a second switch on either side of a transformer via the first switch in a normal operating mode, recover voltage from the secondary side to the primary side by reversing a direction of the power transfer when a voltage on the primary side of the DC-DC power conversion circuitry is less than an operating voltage of gate driver circuitry configured to operate the first switch and the second switch, and resume the normal operating mode of the DC-DC power conversion circuitry when the voltage on the primary side is greater than the operating voltage of the gate driver circuitry.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
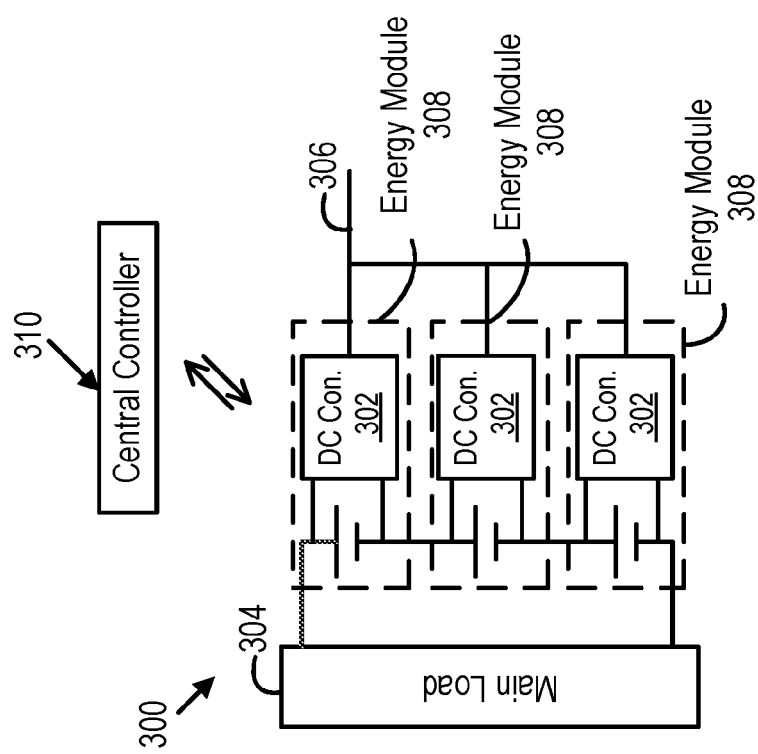
FIG. 1 is an exemplary schematic diagram of a modular energy management system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary schematic diagram of a modular energy management system 300 that may be included in an electric vehicle (EV). For example, three energy modules 308 are connected in series and provide power to a main load 304 and one or more subsystem loads 306. In addition, each of the energy modules 308 includes an energy source such as a battery cell, solar cell, fuel cell, or AC charging cell, a local controller, and a modular DC-DC converter 302. The modular DC-DC converter 302 provides bi-directional power transfer between the energy modules 308, the main load 304, and the subsystem loads 306. Central controller 310 controls power flow between the energy modules 308, the main load 304, and the subsystem loads 306. The main load 304 and the subsystem loads 306 can be any type of electric load in a vehicle, but in one implementation, the subsystem loads 306 are auxiliary loads of a vehicle, such as a security system or driver alert system, and the main load 304 is a load associated with operating a vehicle drive train, such as a motor. The local controller of the energy modules 308 and the central controller 310 can be configured with transceivers to exchange data, control signals, and the like. In some implementations, the central controller 310 and the local controllers can be electrically connected via a hard wire connection or a wireless connection.

In some implementations, the central controller 310 controls activation of gate driver circuits, also referred to as gate driver circuitry, that drive operation of switches of the modular DC-DC converter 302. The switches are turned on and off by the gate driver circuits, which results in power being transferred between a primary side and a secondary side of the modular DC-DC converter 302 in order to provide power to the main load 304 or subsystem loads 306. Each of the modules 308 in the modular energy management system 300 is independent of the other modules 308 and can supply power to the gate driver circuits from a primary side power source or a secondary side power source. Details regarding the supply of power to the gate driver circuits of the modular DC-DC converter 302 are discussed further herein.

In addition, the processes described further herein may be implemented on other types of energy management system than the modular energy management system 300. For example, other types of energy management systems may have greater or fewer loads, greater or fewer energy modules configured in series or parallel configurations, and the like.

Figures 2A, 2B:
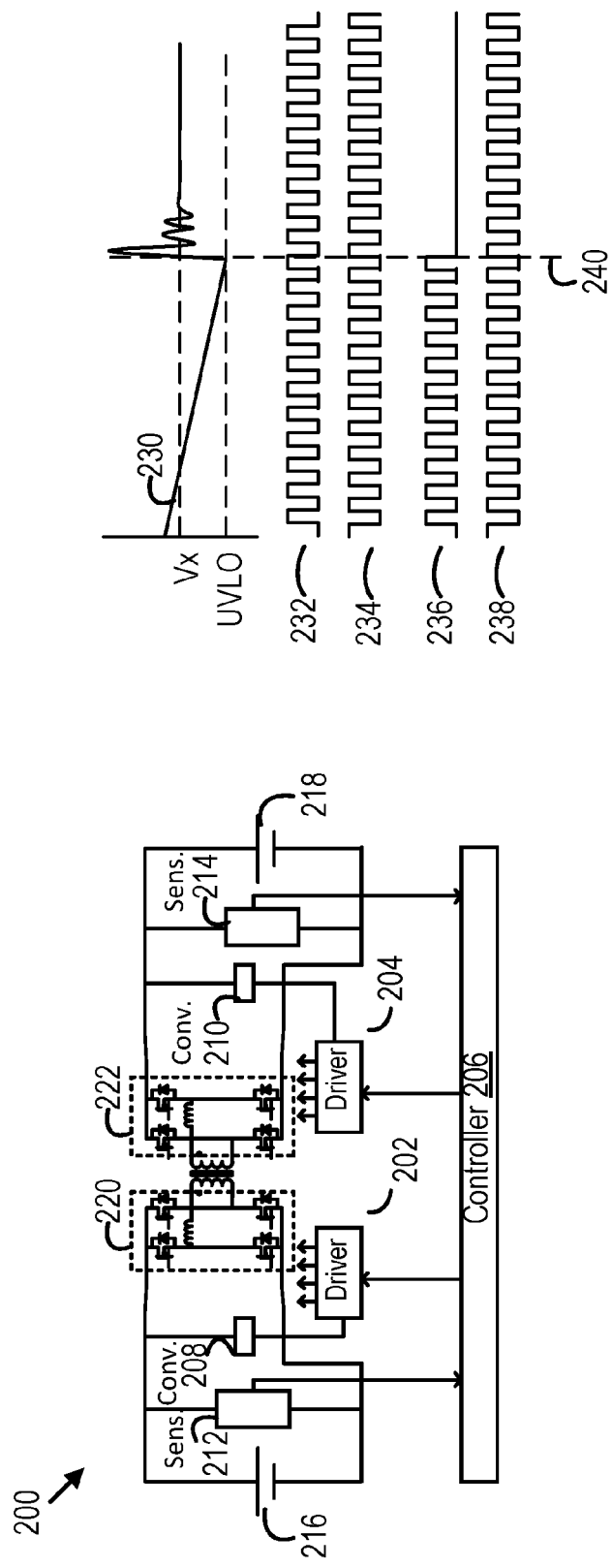
FIG. 2A is an exemplary schematic diagram of a DC-DC power conversion circuit.
FIG. 2B is an exemplary graph of switching and voltage waveforms of a DC-DC power conversion circuit.

FIG. 2A is an exemplary schematic diagram of a related art DC-DC power conversion circuit 200. The DC-DC power conversion circuit 200 can include a primary side and a secondary side that are configured on either side of a transformer. The primary side includes a primary DC power source 216 and the secondary side includes a secondary DC power source 218 which can both operate as power sources or power sinks depending on a direction of power transfer. Voltage sensors 212 and 214 can also be included on each side of the DC-DC power conversion circuit 200 to measure a voltage of the primary DC power source 216 or the secondary DC power source 218. Sensor data obtained by the voltage sensors 212 and 214 can be transmitted to a controller 206 that controls operation of gate driver circuits 202 and 204. The controller 206 can be the central controller 310 of the modular energy management system 300 or a local controller associated with an individual energy module 308. The gate driver circuit 202 controls a set of four primary switches 220, and the gate driver circuit 204 controls a set of four secondary switches 222. In addition, power can be supplied to the gate driver circuit 202 by the primary DC power source 216 via a gate driver power converter 208. Likewise, power can be supplied to the gate driver circuit 204 by the secondary DC power source 218 via gate driver power converter 210. In addition, each of the primary switches 220 and secondary switches 222 have diodes in parallel from source to drain of the switches 220 and 222 that provide a path for current to flow when the switches 220 or 222 are turned off.

In some implementations, the gate driver power converters 208 and 210 are additional DC-DC power conversion circuits that convert a voltage of the primary DC power source 216 or the secondary DC power source 218 to an operating voltage of the gate driver circuit 202 or 204. For example, the gate driver power converter 208 can convert a 40 volt (V) primary DC power source 216 to a 20V operating voltage of the gate driver circuit 202. As power is transferred from the primary side to the secondary side of the DC-DC power conversion circuit 200, the voltage of the primary DC power source 216 decreases. Likewise, as power is transferred from the secondary side to the primary side of the DC-DC power conversion circuit 200, the voltage of the secondary DC power source 218 decreases. If the voltage of the primary DC power source 216 or the secondary DC power source 218 falls below the operating voltage of the gate driver circuit 202 or 204, then the gate driver circuit 202 or 204 shuts down and is unable to operate the primary switches 220 or the secondary switches 222, which can be referred to as an under voltage lockout (UVLO) condition.

In some implementations, power is transferred between the primary side and the secondary side of the DC-DC power conversion circuit 200 by controlling operation of the primary switches 220 and/or the secondary switches 222. A direction of power transfer and an amount of power transfer can be controlled based on a direction and amount of phase shift between switch pulses produced by operating the primary switches 220 and/or the secondary switches 222. For example, a positive phase shift generates power flow from the primary side to the secondary side of the DC-DC power conversion circuit 200, and a negative phase shift generates power flow from the secondary side to the primary side of the DC-DC power conversion circuit 200. In addition, when the UVLO condition occurs on the primary or secondary side, the controller 206 can restore the primary or secondary DC power source voltage 216 or 218 to clear the UVLO condition based only on voltage. Clearing the UVLO condition can produce signal oscillations that can damage the primary switches 220, secondary switches 222, and other circuit components due to the phase shift that is present between pulses of the primary switches 220 and secondary switches 222 when the power direction reversal occurs.

FIG. 2B is an exemplary graph of switching and voltage waveforms of the DC-DC power conversion circuit 200. For example, graph 230 shows the voltage of the primary DC power source 216 with respect to time as power is transferred from the primary side to the secondary side of the DC-DC power conversion circuit 200. In addition, graph 232 illustrates switching cycles of the primary switches 220 over time, graph 234 illustrates switching cycles of the secondary switches 222 over time, graph 236 illustrates signals issued by the primary gate driver 202 over time, and graph 238 illustrates signals issued by the secondary gate driver 204 over time.

During normal operations, the voltage of the primary DC power source 216 decreases over time as power is transferred from the primary side to the secondary side of the DC-DC power conversion circuit 200. When the voltage of the primary DC power source 216 decreases to less than or equal to a predetermined UVLO threshold that corresponds to the operating voltage of the gate driver circuit 202, the primary DC power source 216 is unable to provide power to the gate driver 202, and the gate driver 202 shuts down. For example, the graph 236 shows that primary gate driver signals cease when the voltage of the primary DC power source 216 reaches the UVLO threshold at time 240. In addition, the voltage of the primary DC power source 216 is recovered from the secondary side to the primary side of the DC-DC power conversion circuit 200 via the secondary switches 222 as well as the diodes in parallel with each of the primary switches 220. In some implementations, the voltage of the primary DC power source 216 is immediately recovered to a voltage V, which is based on a turn ratio of the transformer. In addition, as the voltage of the primary DC power source 216 is recovered when the UVLO threshold is reached at time 240, voltage oscillations are produced, which can damage the primary switches 220, secondary switches 222, and other circuit components.

Figures 3A, 3B:
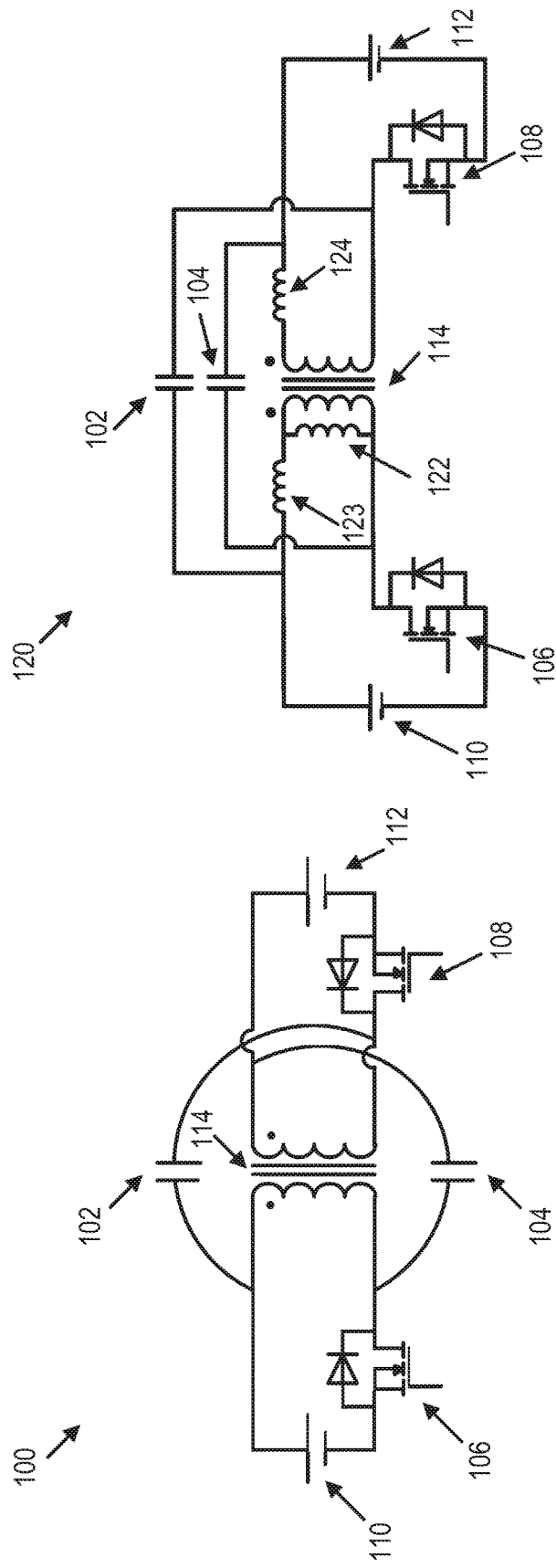
FIG. 3A is an exemplary schematic diagram of an isolated DC-DC power conversion circuit.
FIG. 3B is an exemplary schematic diagram of an isolated DC-DC power conversion circuit.

FIG. 3A is an exemplary illustration of an isolated DC-DC power conversion circuit 100. The DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power source 110, and the secondary side can include a secondary switch 108 and a secondary DC power source 112. The primary DC power source 110 and the secondary DC power source 112 can function as either a power source or a power sink depending on the direction of power transfer through the DC-DC power conversion circuit 100. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power source 110 to the voltage of the secondary DC power source 112.

In certain implementations, the DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108.

FIG. 3B is another exemplary illustration of an isolated DC-DC power conversion circuit 120. In addition to the components described with respect to the isolated DC-DC power conversion circuit 100 of FIG. 1A, the isolated DC-DC power conversion circuit 120 can also include an excitation inductor 122 and leakage inductors 123 and 124. In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the excitation inductor 122 and/or the leakage inductors 123 and 124 can illustrate an equivalent circuit for a real transformer. The excitation inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120. In order to provide a more concise description, the isolated DC-DC power conversion circuit 100 and 120 can be used interchangeably throughout the disclosure.

Figures 4, 5:
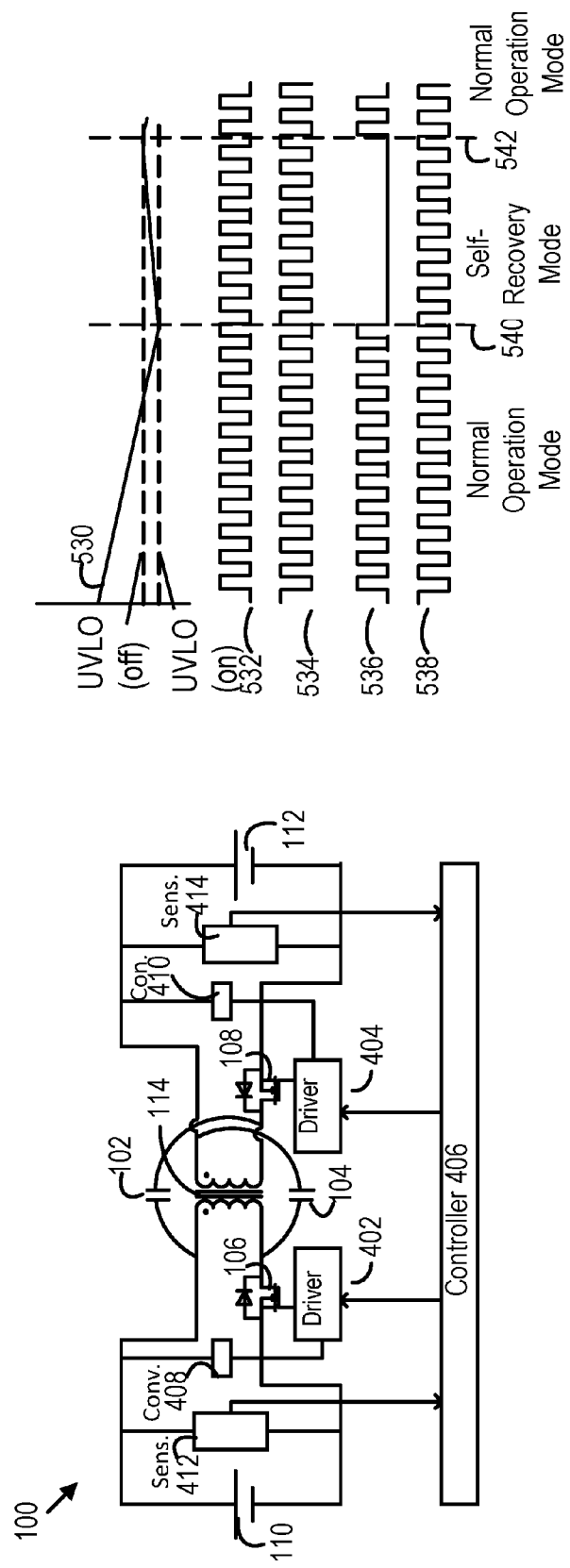
FIG. 4 is an exemplary schematic diagram of a DC-DC power conversion circuit.
FIG. 5 is an exemplary graph of switching and voltage waveforms of a DC-DC power conversion circuit.

FIG. 4 is an exemplary schematic diagram of the DC-DC power conversion circuit 100 with associated gate driver circuitry. In addition to the components described with in FIGS. 3A and 3B, the DC-DC power conversion circuit 100 can also include voltage sensors 412 and 414 on each side of the DC-DC power conversion circuit 100 to measure a voltage of the primary DC power source 110 or the secondary DC power source 112. Sensor data obtained by the voltage sensors 412 and 414 can be transmitted to a controller 406 that controls operation of gate driver circuits 402 and 404. The controller 406 can be the central controller 310 of the modular energy management system 300 or a local controller associated with an individual energy module 308. The gate driver circuit 402 controls the primary switch 106, and the gate driver circuit 404 controls the secondary switch 108. In addition, power can be supplied to the gate driver circuit 402 by the primary DC power source 110 via a gate driver power converter 408. Likewise, power can be supplied to the gate driver circuit 404 by the secondary DC power source 112 via gate driver power converter 410. In addition, the primary switch 106 and the secondary switch 108 have diodes in parallel from source to drain that provide a path for current to flow when the primary switch 106 or the secondary switch 108 are turned off.

In some implementations, the gate driver power converters 408 and 410 are additional DC-DC power conversion circuits that convert a voltage of the primary DC power source 110 or the secondary DC power source 112 to an operating voltage of the gate driver circuit 402 or 404. For example, the gate driver power converter 408 can convert a 40 volt (V) primary DC power source 112 to a 20V operating voltage of the gate driver circuit 402. As power is transferred from the primary side to the secondary side of the DC-DC power conversion circuit 100, the voltage of the primary DC power source 110 decreases. In addition, the implementations described herein are described with respect to power transfer from the primary side to the secondary side of the DC-DC power conversion circuit 100 but can also be applied to power transfer from the secondary side to the primary side of the DC-DC power conversion circuit 100. If the voltage of the primary DC power source 110 or the secondary DC power source 112 falls below the operating voltage of the gate driver circuit 402 or 404, then the UVLO condition occurs, and the gate driver circuit 402 or 404 shuts down and is unable to operate the primary switch 106 or the secondary switch 108.

In some implementations, power is transferred between the primary side and the secondary side of the DC-DC power conversion circuit 100 by controlling operation of the primary switch 106 or the secondary switch 108. As stated previously, the direction of power transfer is based on whether the primary switch 106 or the secondary switch 108 is turned on and off. Also, the amount of power transfer is based on an amount of on-time of the primary switch 106 or the secondary switch 108 during one duty cycle. In some implementations, an amount of off-time for the primary switch 106 or secondary switch 108 is constant. When power is transferred from the primary side to the secondary side of the DC-DC power conversion circuit 100, the UVLO condition occurs when the voltage of the primary DC power source 110 decreases to less than or equal to a predetermined UVLO threshold that can correspond to an operating voltage of the gate driver circuit 402. Likewise, when power is transferred from the secondary side to the primary side of the DC-DC power conversion circuit 100, the UVLO condition occurs when the voltage of the secondary DC power source 112 decreases to less than or equal to a predetermined UVLO threshold, which can correspond to an operating voltage of the gate driver circuit 404. When the primary DC power source voltage decreases to less than or equal to the UVLO threshold, a position primary switch 106 remains constant or off because the voltage at the gate driver 402 is less than the operating voltage. When the UVLO condition occurs, the controller 406 can initiate a self-recovery mode by reversing the direction of power transfer in order to recover voltage to the DC power supply on the side of the DC-DC power conversion circuit 100 that experienced the UVLO condition.

FIG. 5 is an exemplary graph of switching and voltage waveforms of the DC-DC power conversion circuit 100. For example, graph 530 shows the voltage of the primary DC power source 110 with respect to time as power is transferred from the primary side to the secondary side of the DC-DC power conversion circuit 100. In addition, graph 532 illustrates switching cycles of the primary switch 106 over time, graph 534 illustrates switching cycles of the secondary switch 108 over time, graph 236 illustrates signals issued by the primary gate driver 402 to the primary switch 106 over time, and graph 238 illustrates signals issued by the secondary gate driver 404 to the secondary switch 108 over time.

During the normal operation mode from time zero to time 540, the voltage of the primary DC power source 110 decreases over time as power is transferred from the primary side to the secondary side of the DC-DC power conversion circuit 100. When the voltage of the primary DC power source 110 decreases to less than or equal to a predetermined UVLO threshold (UVLO on) that corresponds to the operating voltage of the gate driver circuit 402, the primary DC power source 110 is unable to provide power to the gate driver 402, and the gate driver 402 shuts down. For example, the graph 536 shows that primary gate driver signals cease when the voltage of the primary DC power source 110 reaches the UVLO threshold at time 540.

From time 540 to time 542, the controller 406 operates the DC-DC power conversion circuit 100 in self-recovery mode by reversing the direction of power transfer in order to recover the voltage of the primary DC power source 110. For example, if the voltage of the primary DC power source 110 decreases to less than or equal to the UVLO threshold, the direction of power transfer is reversed to transfer power from the secondary side to the primary side of the DC-DC power conversion circuit 100. Because power transfer through the DC-DC power conversion circuit 100 is based on on-time of the primary switch 106 or secondary switch 108 and is independent of a phase shift of switch pulses, the reversal of the direction of power transfer is smooth and may not experience the oscillations that occur in the DC-DC power conversion circuit 200.

In addition, the secondary switch 108 may function as a synchronous rectifier by being cycled on and off at predetermined intervals during the duty cycle of the primary switch 106 as power is transferred from the primary side to the secondary side of the DC-DC power conversion circuit 100. When the primary DC power source 116 decreases to less than or equal to the UVLO threshold and the primary switch 106 remains constant or off, the secondary switch 108 can continue to cycle on and off to transfer power from the secondary side to the primary side of the DC-DC power conversion circuit 100. Once the voltage of the primary DC power source 110 increases to greater than or equal to a normal operating voltage threshold (UVLO off) at time 542, then the normal operating mode can be resumed. In some implementations, the normal operating voltage threshold is greater than the UVLO threshold.

In some implementations, the normal operating mode refers to transferring power from one side to the other side of the DC-DC power conversion circuit 100 in a direction that corresponds to the direction of power transfer when the UVLO condition occurred. In both the normal operating mode and the self-recovery mode, the amount of power transfer between the primary and secondary sides of the DC-DC power conversion circuit 100 is based on the on-time of the primary switch 106 or secondary switch 108 and is independent of the voltage of the primary DC power source 110 or the secondary DC power source 112. In addition, the normal operating voltage threshold (UVLO off) can correspond to the operating voltage of the gate driver circuit 402 plus a predetermined buffer amount. The predetermined buffer amount can be based on a rate of change of the voltage of the primary DC power source 110 in the normal operating mode. For example, the controller 406 can determine the predetermined buffer amount by taking an average of rates of voltage decrease for various load sizes.

Figure 6:
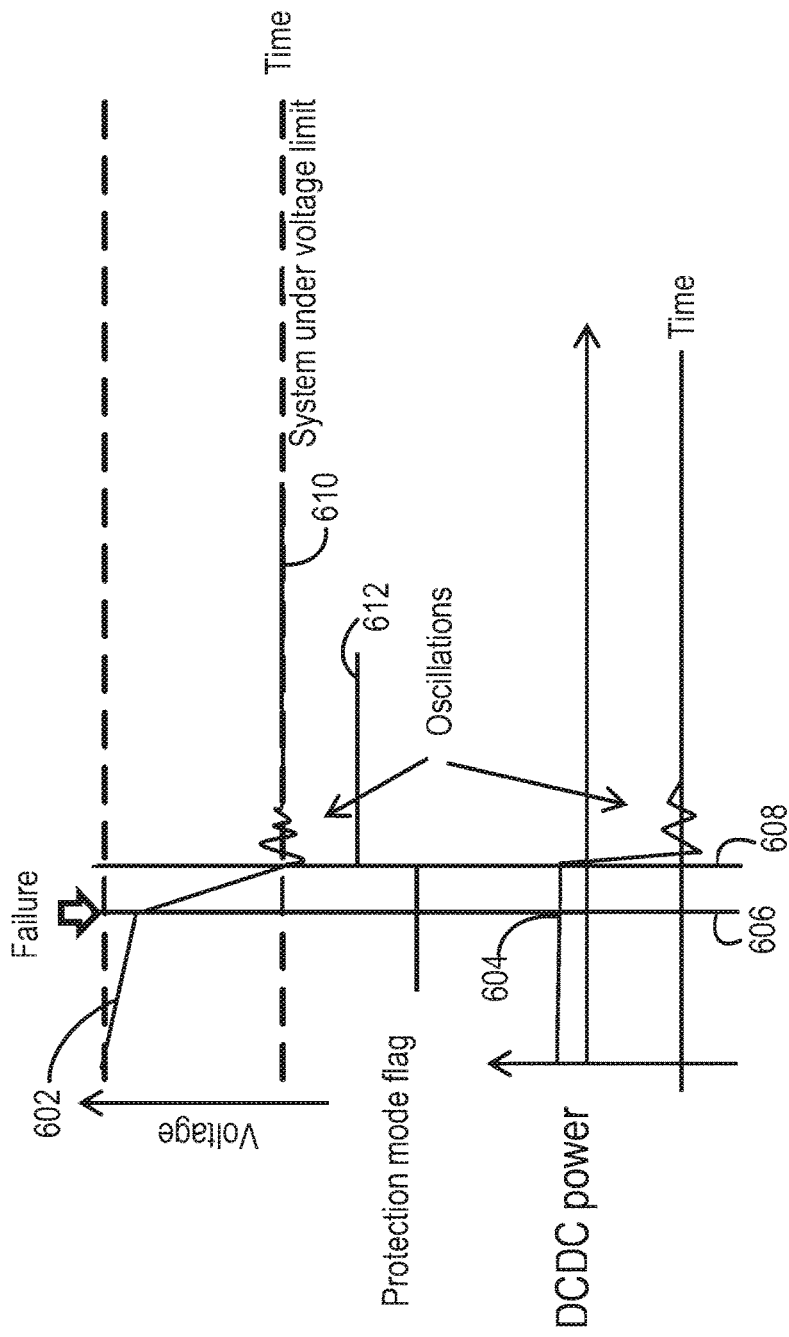
FIG. 6 is an exemplary graph of voltage and power waveforms for a DC-DC power conversion circuit without self-recovery control.

FIG. 6 is an exemplary graph of voltage and power waveforms for the DC-DC power conversion circuit 100 without self-recovery control. For example, graph 602 illustrates the voltage over time of the primary DC power source 110 as power is transferred from the primary side to the secondary side to the DC-DC power conversion circuit 100, and graph 604 illustrates a corresponding amount of power transfer from the primary side to the secondary side over time. From time zero to time 606, the voltage of the primary DC power source 110 is reduced at a rate of decrease as power is transferred the primary side to the secondary side of the DC-DC power conversion circuit 100 based on load size, number of loads, and the like, which is also indicated by a positive amount of power transfer in the graph 604.

At time 606, a source cell such as a battery cell of one of the energy modules 308 fails, which can produce a greater rate of decrease in the voltage of the primary DC power source 110 than the rate of decrease prior to time 606. In some implementations, the battery cell failure may be an open failure. At time 608, the voltage of the primary DC power source 110 decreases to a system under voltage limit 610, and the energy module 308 and/or source cell associated with the DC-DC power conversion circuit 100 may be disabled by the controller 406. For example, the controller 406 can set protection mode flag 612 at time 608 when the system under voltage limit 610 is reached. The system under voltage limit 610 can correspond to a voltage threshold that indicates that the energy module 208 has failed. In some implementations, the rate of decrease of the voltage of the primary DC power source 110 between times 606 and 608 can be great enough that voltage oscillations are produced in the primary DC power source 110 as the system under voltage limit 610 is reached that can damage components of the DC-DC power conversion circuit 100. Also, oscillations are also produced after time 608 in the power transfer graph as the amount of power transfer shifts from a positive value to a negative value, which can indicate a reversal in the direction of power transfer.

Figure 7:
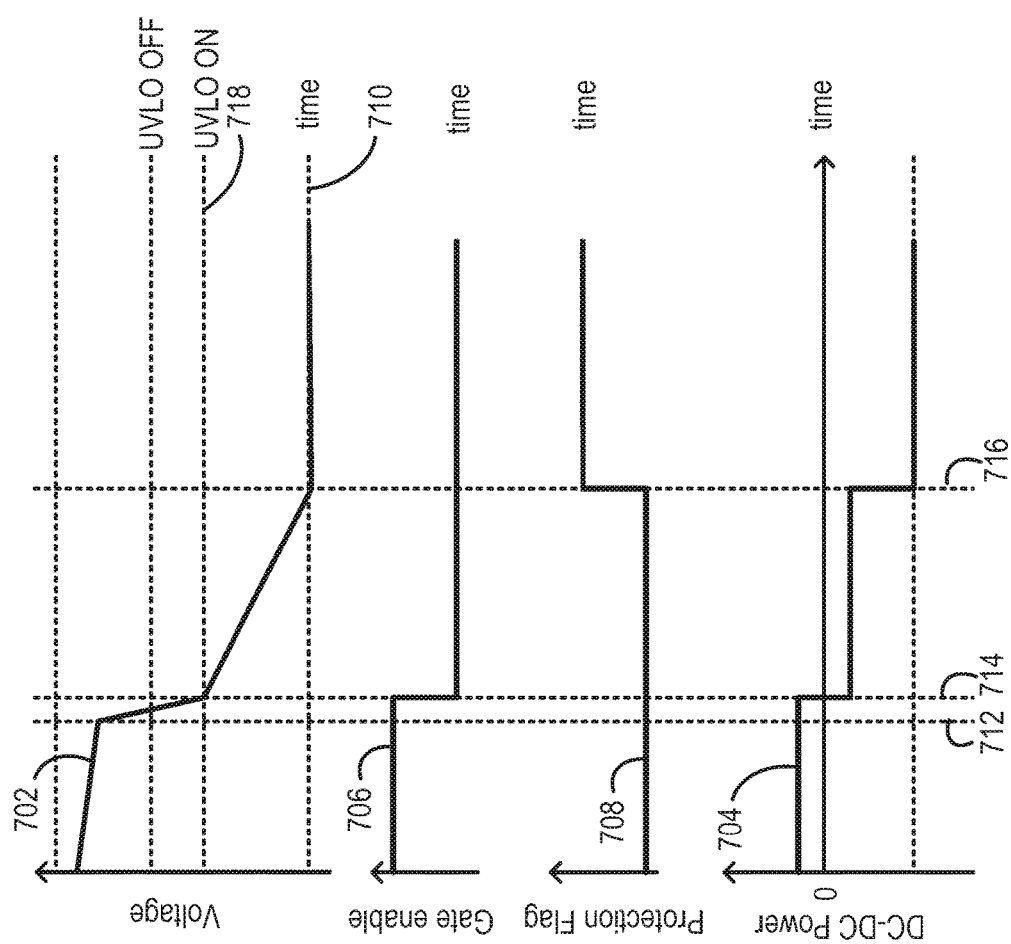
FIG. 7 is an exemplary graph of voltage and power waveforms for a DC-DC power conversion circuit with self-recovery control.

FIG. 7 is an exemplary graph of voltage and power waveforms for the DC-DC power conversion circuit 100 with self-recovery control when failure of an energy module 308 occurs. For example, graph 702 illustrates the voltage over time of the primary DC power source 110 as power is transferred from the primary side to the secondary side to the DC-DC power conversion circuit 100, and graph 704 illustrates a corresponding amount of power transfer from the primary side to the secondary side over time. Also, graph 706 illustrates a gate enable signal that indicates whether the gate driver 402 is able to operate the primary switch 106. Graph 708 illustrates a protection mode flag signal that can be issued by the controller 106 when the voltage of the primary DC power source 110 is less than or equal to system under voltage limit 710. From time zero to time 712, the voltage of the primary DC power source 110 decreases at a rate of decrease based on load size, number of loads, and the like as power is transferred the primary side to the secondary side of the DC-DC power conversion circuit 100, which is also indicated by a positive amount of power transfer in the graph 704.

At time 712, a battery cell of one of the energy modules 308 fails, which can produce a greater rate of decrease in the voltage of the primary DC power source 110 than the rate of decrease prior to time 712. In some implementations, the battery cell failure may be an open failure. At time 714, the voltage of the primary DC power source 110 decreases to a UVLO threshold 718 (UVLO on), which can correspond to the operating voltage of the gate driver 402. In addition, the gate enable signal 706 goes from high to low at time 714, which indicates that the primary DC power source 110 is unable to provide power to the gate driver 402, and the gate driver 402 shuts down.

Between times 714 and 716, the DC-DC power conversion circuit 100 is operated in the self-recovery mode, and the direction of power transfer is reversed from the secondary side to the primary side of the DC-DC power conversion circuit as indicated by the amount of power transfer being that is less than zero between times 714 and 716 in the graph 704. Since the energy module 308 associated with the DC-DC power conversion circuit 100 has failed, the voltage of the primary DC power source 110 continues to decrease at a rate that is less than the rate of decrease between times 712 and 714. The reduced rate of decrease between times 714 and 716 can result in a reduction in the voltage oscillations produced when the voltage of the primary DC power source 110 decreases to the system under voltage limit 710, which can be the voltage threshold that indicates that the energy module 308 has failed. In some implementations, the reduced rate of decrease can result in an elimination of the voltage oscillations. The protection mode flag 708 can go from low to high at time 716 when the system under voltage limit 710 is reached.

At time 716, when the voltage of the primary DC power source 110 is at the under voltage limit 710, the energy module 308 and/or the source cell supplying power to the energy module 308 is disabled. Even when the energy module 308 has failed and the primary DC power supply 110 is at the under voltage limit 710, power can still be transferred from the secondary side to the primary side of the DC-DC power conversion circuit 100 from other power sources, energy modules 308, or the like. In some implementations, the amount of power transfer from the secondary side to the primary side of the DC-DC power conversion circuit is further increased, which is indicated by a larger negative amount of power transfer in the graph 704. The self-recovery mode implemented between times 714 and 716 provides a two-step power reduction that provides a smoother transition to energy module failure by reducing or eliminating occurrences of voltage oscillations, which can protect the components of the energy module 308 and associated DC-DC power conversion circuit 100.

Figure 8:
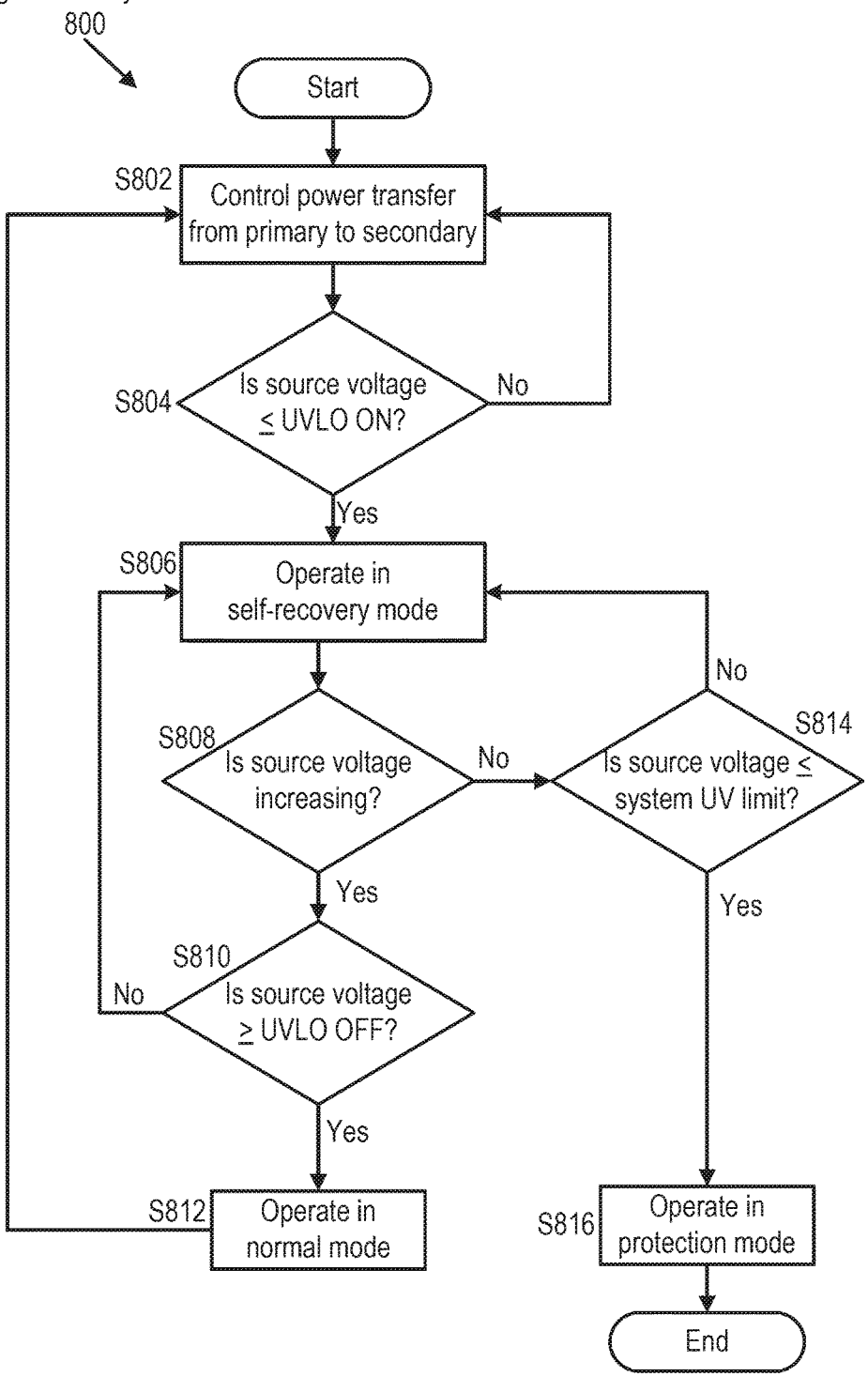
FIG. 8 is an exemplary flowchart of a voltage recovery process.

FIG. 8 is an exemplary flowchart of a voltage recovery process 800. The voltage recovery process 800 can be performed by the controller 406 with one or more electronic control units (ECUs) that include control circuitry. The ECUs of the controller 406 can process sensor data, display electric power module information to a user, and send control signals to actuators that activate components of the DC-DC power conversion circuit 100 as well as power sources or electrical loads connected to the DC-DC power conversion circuit 100. In some implementations, the actuators send control signals to the gate drivers 402 and 404 to control the duty cycle and switching frequency of the primary switch 106 and secondary switch 108, operating frequency, and direction of power transfer of the DC-DC power conversion circuit 100. The ECUs can also align a plurality of DC-DC power conversion circuits to perform power transfer among a one or more sources and/or loads within an electric vehicle (EV) power transfer system.

At step S810, the controller 406 controls power transfer from the primary side to the secondary side of the DC-DC power conversion circuit 100 in the normal operating mode by cycling the primary switch 106 on and off at predetermined time intervals via the gate driver 402 based on an amount of power to be transferred. In some implementations, the controller 406 can control the primary switch 108 with soft switching so that the primary switch 108 is turned on when the current on the primary side of the DC-DC power conversion circuit 100 is approximately zero in order to implement zero current switching (ZCS). Likewise, the primary switch 108 can be turned off when the voltage on the primary side is approximately zero to implement zero voltage switching (ZVS). During one duty cycle of the primary switch 106, power is transferred from the primary to the secondary side of the DC-DC power conversion circuit 100 via the transformer 114, which can be referred to as inductive power transfer, and via the cross-connected capacitors 102 and 104 and leakage inductors 123 and 124, which can be referred to as capacitive power transfer. In addition, as power is transferred from the primary side to the secondary side, the voltage of the primary DC power source 110 decreases at a rate based on load size, number of loads, and the like.

At step S804, the control circuitry determines if the voltage of the primary DC power source 110 is less than or equal to the UVLO threshold, which can correspond to the operating voltage of the gate driver 402. If the voltage of the primary DC power source 110 is less than or equal to the UVLO threshold, resulting in a "yes" at step S804, then step S806 is performed. Otherwise, if the voltage of the primary DC power source 110 is greater than the UVLO threshold, resulting in a "no" at step S804, then the process returns to step S802 to continue to transfer power from the primary side to the secondary side of the DC-DC power conversion circuit 100 in the normal operating mode.

At step S806, if the voltage of the primary DC power source 110 is less than or equal to the UVLO threshold, then the controller 406 controls the DC-DC power conversion circuit in the self-recovery mode. In some implementations, the direction of power transfer is reversed in order to recover the voltage of the primary DC power source 110. For example, if the voltage of the primary DC power source 110 decreases to less than or equal to the UVLO threshold, the direction of power transfer is reversed to transfer power from the secondary side to the primary side of the DC-DC power conversion circuit 100. Because power transfer through the DC-DC power conversion circuit 100 is based on-time of the primary switch 106 or secondary switch 108 and is independent of a phase shift of switch pulses, the reversal of the direction of power transfer is smooth and may not experience the oscillations that occur in the DC-DC power conversion circuit 200.

In addition, the secondary switch 108 may function as a synchronous rectifier during the normal operation mode by being cycled on and off at predetermined intervals during the duty cycle of the primary switch 106 as power is transferred from the primary side to the secondary side of the DC-DC power conversion circuit 100. When the primary DC power source 116 decreases to less than or equal to the UVLO threshold and the primary switch 106 remains constant or off, the secondary switch 108 can continue to cycle on and off to transfer power from the secondary side to the primary side of the DC-DC power conversion circuit 100.

At step S808, the control circuitry determines whether the voltage of the primary DC power source 110 is increasing. In some implementations, when the self-recovery mode is implemented, the reversal of the direction of power transfer from the secondary side to the primary side of the DC-DC power conversion circuit 100 causes the voltage of the primary DC power source 110 to increase to greater than the UVLO threshold so that the primary DC power source 110 can power the gate driver 402. However, if the source cell of the energy module 308 fails, such as when a battery cell experiences an open failure, the voltage of primary DC power source 110 can continue to decrease in the self-recovery mode. If the voltage of the primary DC power source 110 is increasing in the self-recovery mode, resulting in a "yes" at step S808, then step S810 is performed. Otherwise, if the voltage of the primary DC power source 110 is constant or decreasing, resulting in a "no" at step S808, then step S814 is performed.

At step S810, the control circuitry determines whether the voltage of the primary DC power source 110 is greater than or equal to the normal operating voltage threshold (UVLO OFF). In some implementations, the normal operating voltage threshold can correspond to the operating voltage of the gate driver circuit 402 plus a predetermined buffer amount. The predetermined buffer amount can be based on a rate of change of the voltage of the primary DC power source 110 in the normal operating mode. For example, the controller 406 can determine the predetermined buffer amount by taking an average of rates of voltage decrease for various load sizes. If the voltage of the primary DC power source 110 is greater than or equal to the normal operating voltage threshold (UVLO off), resulting in a "yes" at step S810, then step S812 is performed. Otherwise, if the voltage of the primary DC power source 110 is less than the normal operating voltage threshold, resulting in a "no" at step S810, then step S806 is performed, and the controller 406 continues to control the DC-DC power conversion circuit 100 in the self-recovery mode.

At step S812, when the voltage of the primary DC power source 110 has increased to greater than or equal to the normal operating voltage threshold, the normal operation mode can be resumed. In some implementations, the normal operating mode refers to transferring power from one side to the other side of the DC-DC power conversion circuit 100 in a direction that corresponds to the direction of power transfer when the UVLO condition occurred. For example, in the implementation described herein, the normal operation mode refers to transferring power from the primary side to the secondary side of the DC-DC power conversion circuit 100. When the normal operation mode is resumed, the process returns to step S802.

At step S814, the control circuitry determines if the voltage of the primary DC power source 110 is less than or equal to the system under voltage limit, which can be a voltage threshold that indicates that the energy module has failed. Since the energy module 308 associated with the DC-DC power conversion circuit 100 has failed, the voltage of the primary DC power source 110 continues to decrease at a rate that is less than the rate of decrease after the failure of the energy module and prior to activating the self-recovery mode. The reduced rate of decrease can result in a reduction in the voltage oscillations produced when the voltage of the primary DC power source 110 decreases to the system under voltage limit. In some implementations, the reduced rate of decrease can result in an elimination of the voltage oscillations. If the voltage of the primary DC power source 110 is less than or equal to the system under voltage limit, resulting in a "yes" at step S814, then step S816 is performed. Otherwise, if the voltage of the primary DC power source 110 greater than the system under voltage limit, resulting in a "no" at step S814, then step S806 is performed, and the DC-DC power conversion circuit 100 continues to be operated in the self-recovery mode.

At step S816, when the voltage of the primary DC-DC power source 110 has decreased to the system under voltage limit, the controller 406 controls the DC-DC power conversion circuit in a protection mode, and the protection mode flag is set. In some implementations, the energy module 308 and/or the source cell supplying power to the energy module is disabled. Even when the energy module 308 has failed and the primary DC power supply 110 is at the system under voltage limit, power can still be transferred from the secondary side to the primary side of the DC-DC power conversion circuit 100 from other power sources, energy modules, or the like.

Figure 9:
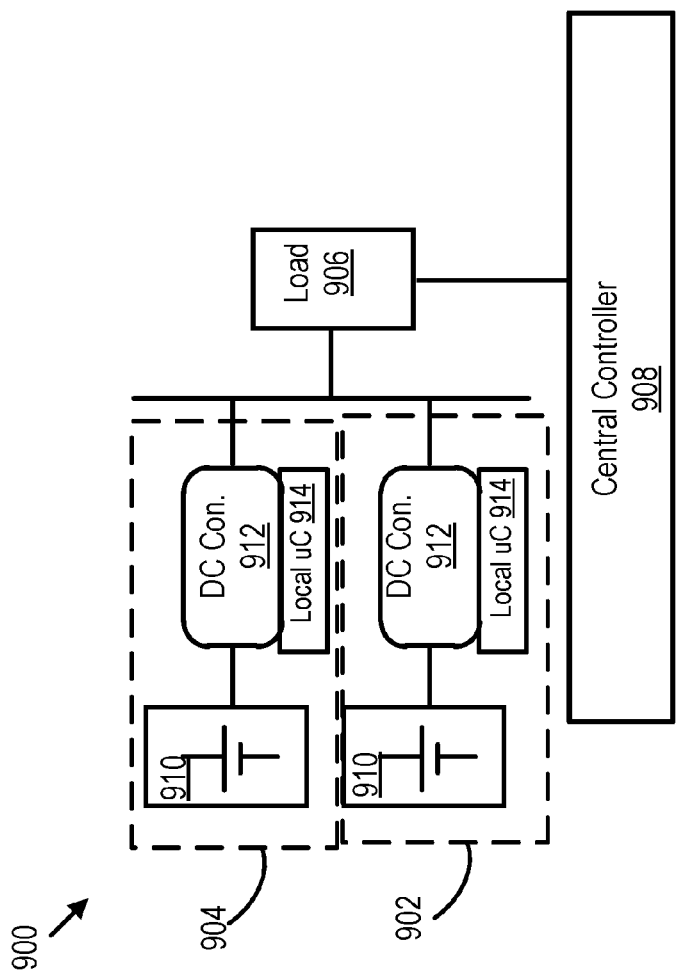
FIG. 9 is an exemplary diagram of an energy management system in standby.

FIG. 9 is an exemplary diagram of a modular energy management system 900 in standby. In some implementations, standby operations can be applied to the modular energy management system 900 in instances when a vehicle is turned off but one or more subsystem loads, such as a security system or power locking system, are still operating. The modular energy management system 900 includes energy modules 902 and 904 that each have a source cell 910, a modular DC-DC power conversion circuit 912, and a local controller 914. The modular DC-DC power conversion circuit 912 can be the DC-DC power conversion circuit 100 according to one implementation. The modular energy management system 900 also includes one or more subsystem loads 906 that receive power from the energy modules 902 and/or 904 as well as a central controller 908. The central controller 908 can be off or disabled when the energy management system 900 is in the standby mode.

In some implementations, the self-recovery mode can also be implemented during standby operations to balance a state of charge of the energy modules 902 and 904 in order to extend battery life during the standby operations. For example, the source cell 910 of the energy module 904 may have a lower state of charge (SOC) than the source cell of the energy module 902. As power is transferred from the energy modules 902 and 904 to the subsystem loads 906, the source cell 910 of the energy module 902 may decrease to less than or equal to the UVLO threshold, which can correspond to the operating voltage of the gate driver circuit 402 for the primary switch 106. When the voltage of the source cell 910 reaches the UVLO threshold, the local controller 914 can implement the self-recovery mode to recover voltage to the source cell energy module 904 from the energy module 902 or the subsystem loads 906.

Figure 10:
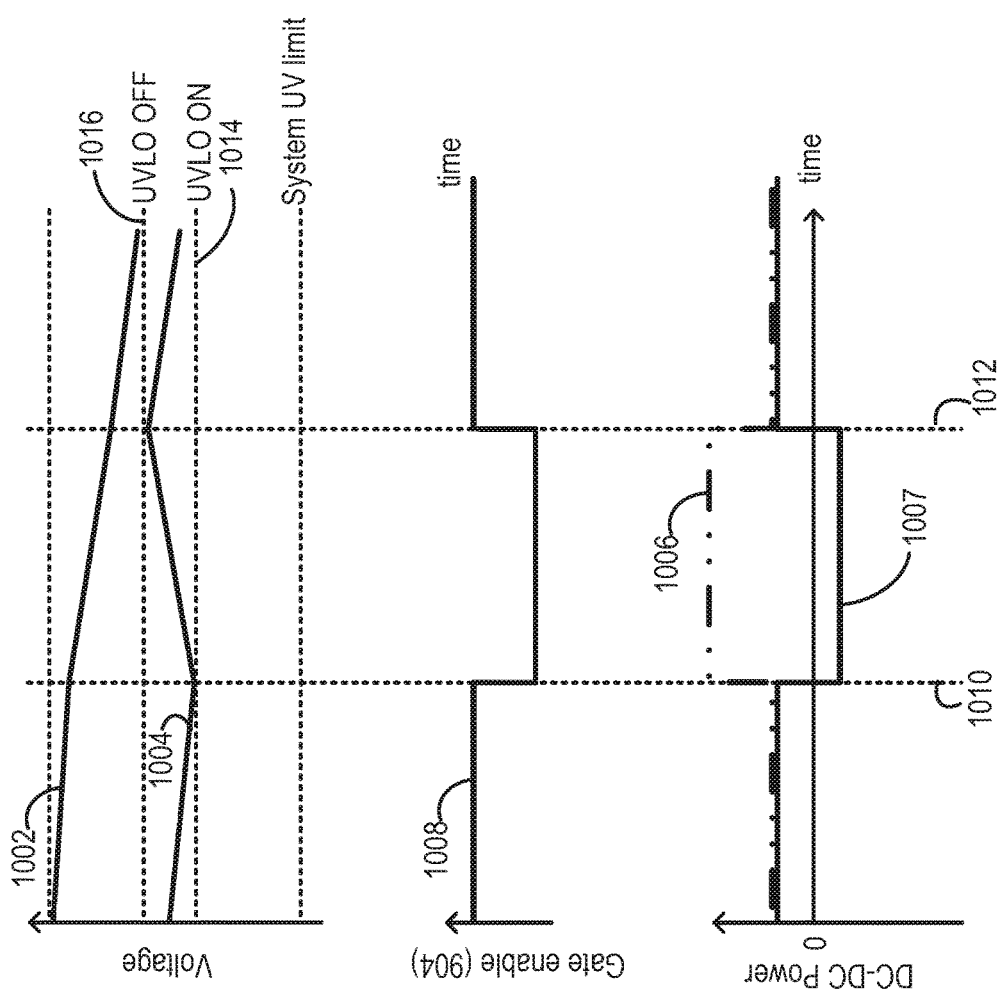
FIG. 10 is an exemplary graph of voltage and power waveforms for a modular energy management system in standby.

FIG. 10 is an exemplary graph of voltage and power waveforms of the modular energy management system 900 when the self-recovery mode is activated during standby operations. For example, graph 1002 illustrates the voltage over time for the source cell 910 of the energy module 902, and graph 1004 illustrates the voltage over time for the source cell 910 of the energy module 904. Graph 1006 and 1007 illustrate a corresponding amount of power transfer by the energy modules 902 and 904, respectively. Also, graph 1008 illustrates a gate enable signal for the energy module 904 that indicates whether the gate driver 402 is able to operate the primary switch 106 of the modular DC-DC power conversion circuit 912.

From time zero to time 1010, the source cells 910 of the energy modules 902 and 904 transfer energy to the subsystem loads 906 via the modular DC-DC power conversion circuits 912, which is indicated by a positive amount of power transfer for both the energy module 902 and the energy module 904 in the graph 1006. The voltages of the source cells 910 can also be interchangeably referred to as the voltages of the energy modules 902 and 904 throughout the disclosure. Since the source cell 910 of the energy module 902 has a higher SOC than the source cell 910 of the energy module 904, the voltage curve 1002 for the energy module 902 is higher than for the energy module 902. As power is transferred to the subsystem loads 906 via the modular DC-DC power conversion circuits 912, the voltages of the energy modules 902 and 904 decrease. At time 1010, the voltage of the energy module 904 decreases to the UVLO threshold 1014, and the self-recovery mode is activated.

Between time 1010 and time 1012, the gate enable signal 1008 for the energy module 104 is low, which indicates that the voltage of the energy module 904 is less than the operating voltage of the gate driver 402 for the primary switch 106 of the modular DC-DC power conversion circuit 912. As shown in the graphs 1002 and 1004, the voltage of the energy module 904 increases and the voltage of the energy module 902 decreases as power is transferred from the energy module 902 to the energy module 904. Likewise, between times 1010 and 1012, the amount of power transfer by the energy module 902 is positive as shown in the graph 1006, which indicates that power is transferred from the energy module 902. Also, the amount of power transfer by the energy module 904 is negative as shown in the graph 1007, which indicates that power is transferred to the energy module 904. At time 1012, the voltage of the energy module 904 increases to the normal operating voltage threshold 1016, the gate enable signal 1008 goes from low to high, and the normal operating mode can be resumed.

Aspects of the present disclosure are directed to providing a way for energy modules of an energy management system to respond to under voltage lockout (UVLO) conditions where the voltage of a DC power source falls below an operating voltage of a gate driver circuit. Because power transfer in the DC-DC power conversion circuit 100 is based on on-time of the primary switch 106 or secondary switch 108 and is independent of phase or voltage, the direction of power transfer can be reversed to recover power to an affected side of the DC-DC power conversion circuit 100 without producing signal oscillations and damaging circuit components. Also, when failure of an energy module, operating in the self-recovery mode reduces the rate of voltage decrease, which can also reduce signal oscillations and protect circuit components.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 11:
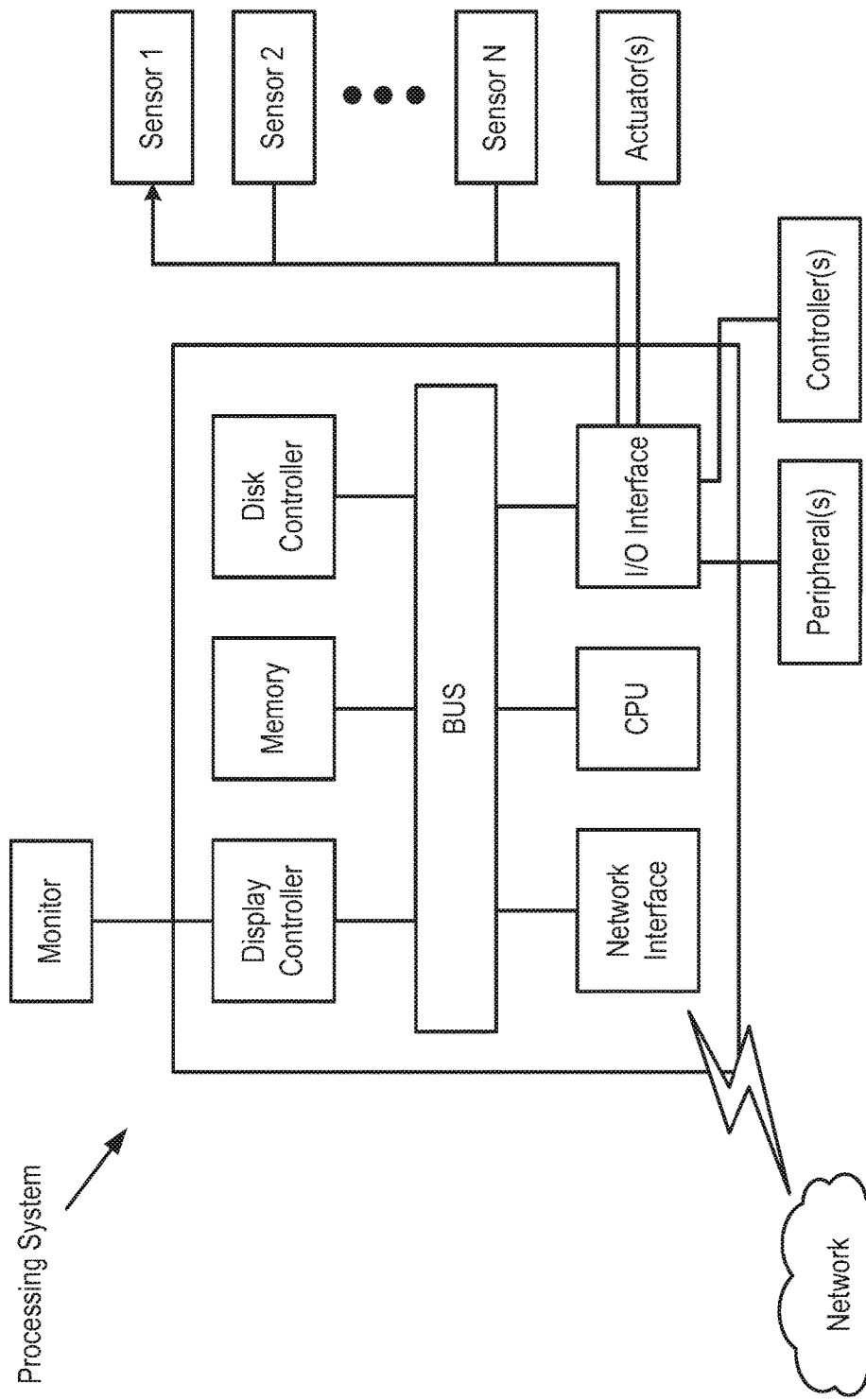
FIG. 11 schematically illustrates a processing system, such as a controller and/or a computer system.

FIG. 11 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle. The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the modular energy management system. For example, the user can use the controller to select energy modules to provide power to one or more auxiliary electrical loads. The I/O interface can also provide an interface for outputting control signals to one or more actuators to control various actuated components, including DC-DC conversion circuitry and other circuitry in the modular energy management system. In some implementations, the actuators send control signals to align the gate driver circuits 402 and 404 to drive operation of the primary switch 106 or secondary switch 108.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
   DC-DC power conversion circuitry including a first switch and a second switch on either side of a transformer;
   gate driver circuitry configured to operate the first switch and the second switch; and
   control circuitry configured to
   control power transfer from a primary side to a secondary side of the DC-DC power conversion circuitry via the first switch in a normal operating mode,
   recover voltage from the secondary side to the primary side by reversing a direction of the power transfer when a voltage on the primary side of the DC-DC power conversion circuitry is less than an operating voltage of the gate driver circuitry, and
   resume the normal operating mode when the voltage on the primary side is greater than the operating voltage of the gate driver circuitry,
   wherein the control circuitry is further configured to reverse the direction of power transfer independent of a phase of the first switch and the second switch.

2. The system of claim 1, wherein the DC-DC power conversion circuitry includes a first capacitor and a second capacitor cross-connected across the transformer.

3. The system of claim 1, wherein the primary side and the secondary side of the DC-DC power conversion circuitry are symmetric across the transformer.

4. The system of claim 1, wherein the gate driver circuitry includes primary gate driver circuitry powered by the primary side of the DC-DC power conversion circuitry and secondary gate driver circuitry powered by the secondary side of the DC-DC power conversion circuitry.

5. The system of claim 4, wherein the DC-DC power conversion circuitry includes primary and secondary gate power converters to convert the voltage on the primary side and a voltage on the secondary side to the operating voltage of the primary gate driver circuitry and the secondary gate driver circuitry.

6. The system of claim 1, wherein the DC-DC power conversion circuitry is configured to perform bi-directional power transfer.

7. The system of claim 1, wherein the second switch of the DC-DC power conversion circuitry is further configured to operate as a synchronous rectifier when power is transferred from the primary side to the secondary side of the DC-DC power conversion circuitry.

8. The system of claim 7, wherein the voltage on the primary side of the DC-DC power conversion circuitry is recovered from the secondary side of the DC-DC power conversion circuitry via the synchronous rectifier when the voltage on the primary side is less than the operating voltage of the gate driver circuitry.

9. The system of claim 1, wherein control circuitry is further configured to control an amount of power transferred between the primary side and the secondary side of the DC-DC power conversion circuitry is based on an on-time of the first switch or the second switch.

10. The system of claim 1, wherein the control circuitry is further configured to control an amount of power transferred between the primary side and secondary side of the DC-DC power conversion circuitry independent of the voltage on the primary side or a voltage on the secondary side.

11. The system of claim 1, wherein the circuitry is further configured to resume the normal operating mode of the DC-DC power conversion circuitry when the voltage on the primary side is greater than a threshold equal to the operating voltage of the gate driver circuitry plus a predetermined buffer amount.

12. The system of claim 11, wherein the control circuitry is further configured to determine the predetermined buffer amount based on a voltage rate of change in the normal operating mode.

13. The system of claim 1, wherein a rate of change of the voltage on the primary side of the DC-DC power conversion circuitry is lower in a recovery mode where the direction of power transfer is reversed than in the normal operating mode when energy module failure occurs.

14. The system of claim 1, wherein the control circuitry is further configured to disable an energy module associated with the DC-DC power conversion circuitry when the voltage on the primary side of the DC-DC power conversion circuitry is less than a system under voltage threshold.

15. The system of claim 14, wherein the system under voltage threshold is less than the operating voltage of the gate driver circuitry.

16. The system of claim 1, wherein the control circuitry is further configured to operate in a recovery mode during standby operations of the DC-DC power conversion circuitry to balance a state of charge of one or more energy modules.

17. A method comprising:
controlling power transfer from a primary side to a secondary side of DC-DC power conversion circuitry including a first switch and a second switch on either side of a transformer via the first switch in a normal operating mode;
recovering voltage from the secondary side to the primary side by reversing a direction of the power transfer when a voltage on the primary side of the DC-DC power conversion circuitry is less than an operating voltage of gate driver circuitry configured to operate the first switch and the second switch, the direction of power transfer being reversed independent of a phase of the first switch and the second switch; and
resuming the normal operating mode when the voltage on the primary side is greater than the operating voltage of the gate driver circuitry.

18. A non-transitory computer-readable storage medium including executable instructions, which when executed by circuitry, causes the circuitry to perform the method according to claim 17.

19. A system controller comprising:
control circuitry configured to
control power transfer from a primary side to a secondary side of DC-DC power conversion circuitry including a first switch and a second switch on either side of a transformer via the first switch in a normal operating mode,
recover voltage from the secondary side to the primary side by reversing a direction of the power transfer when a voltage on the primary side of the DC-DC power conversion circuitry is less than an operating voltage of gate driver circuitry configured to operate the first switch and the second switch, and
resume the normal operating mode of the DC-DC power conversion circuitry when the voltage on the primary side is greater than the operating voltage of the gate driver circuitry,
wherein the control circuitry is further configured to reverse the direction of power transfer independent of a phase of the first switch and the second switch.

* * * * *